UNITED STATES PATENT OFFICE.

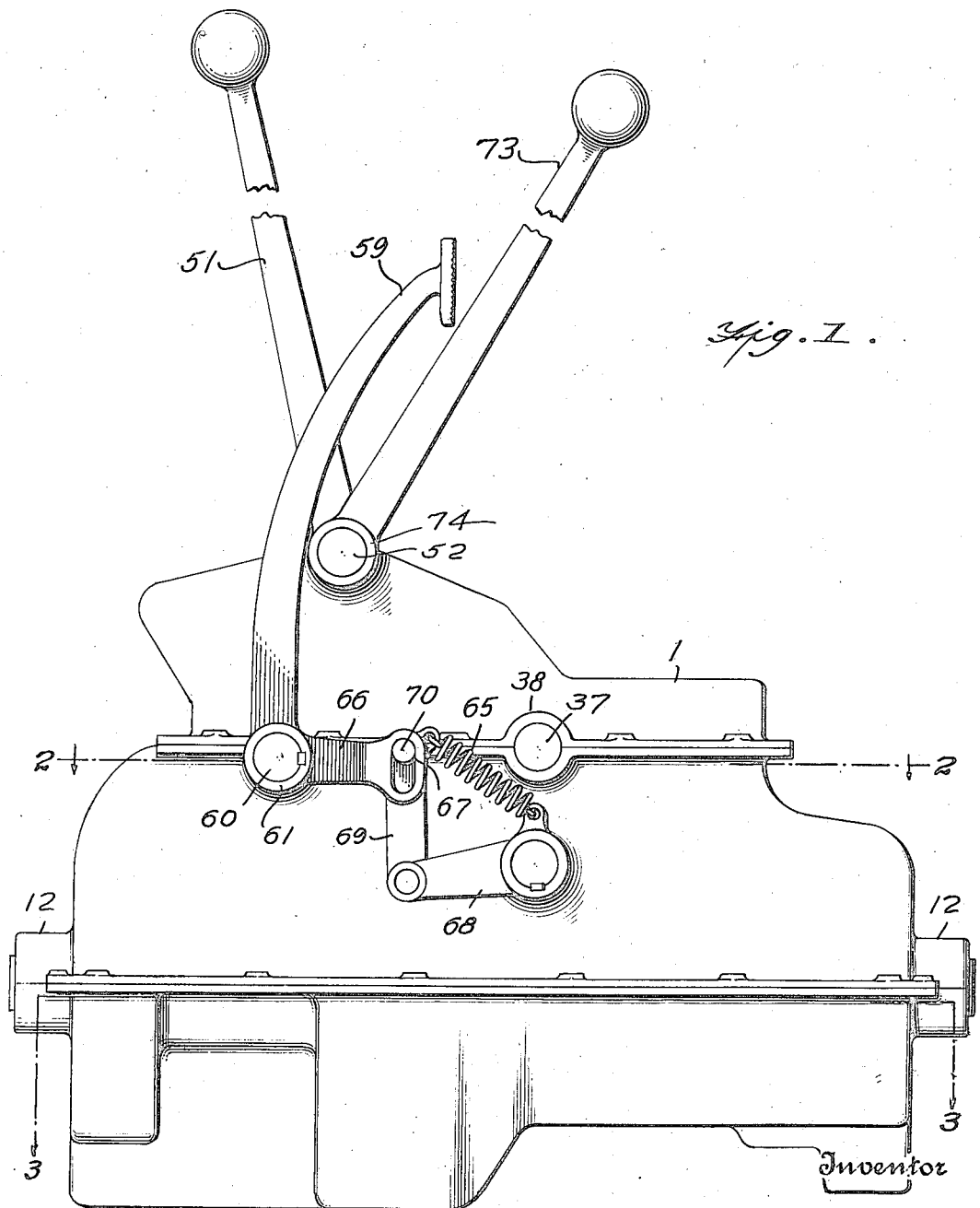

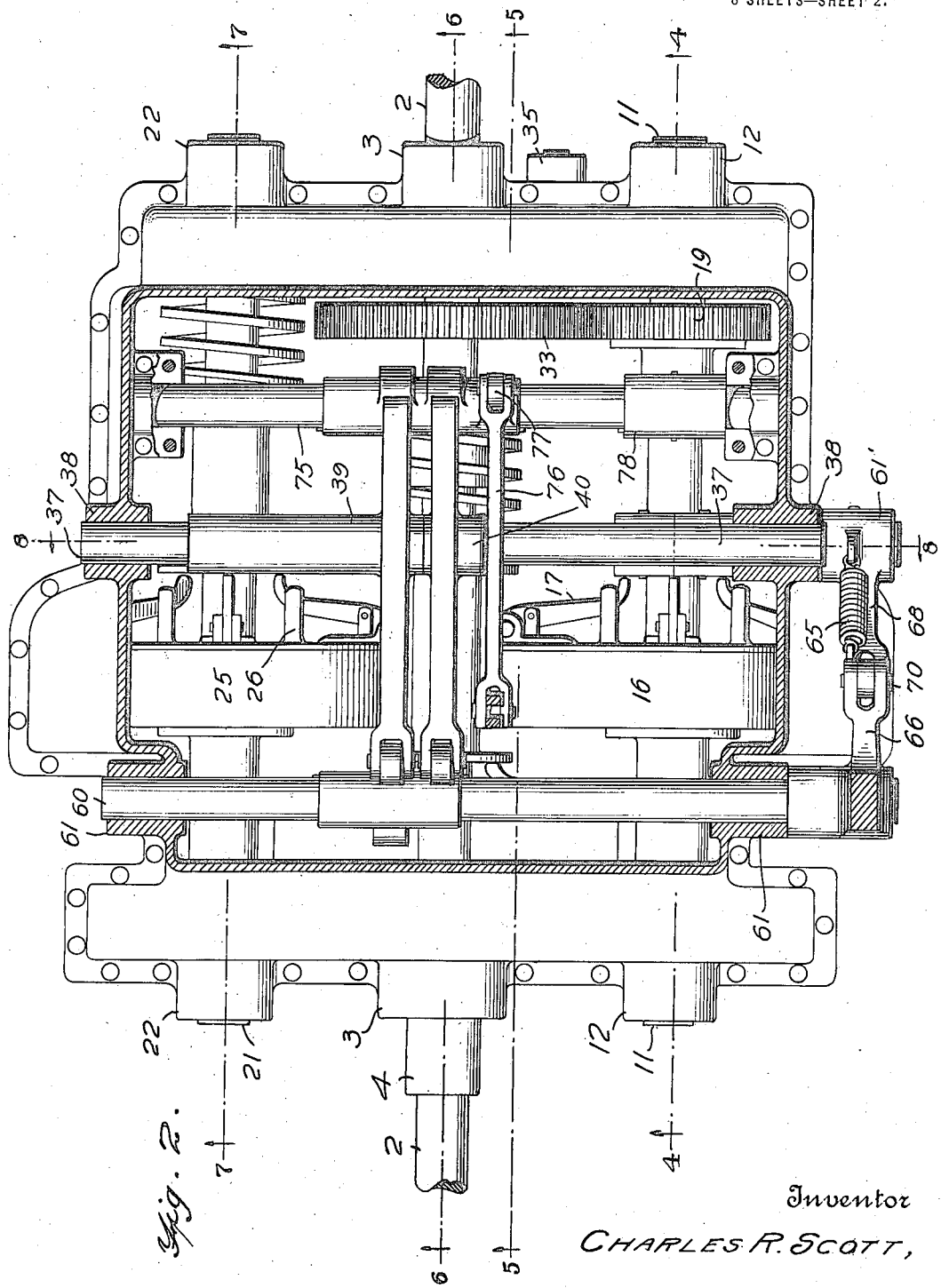

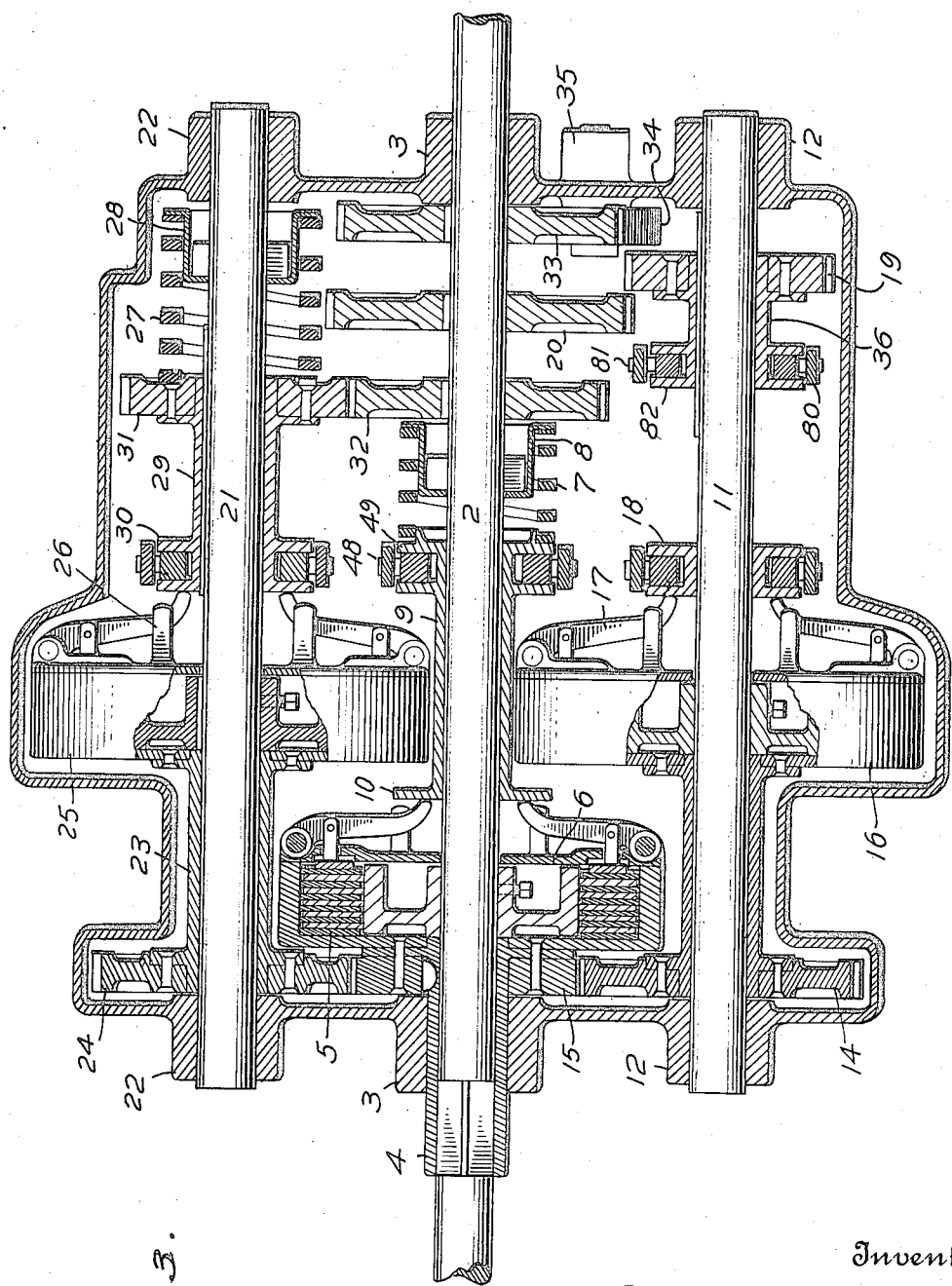

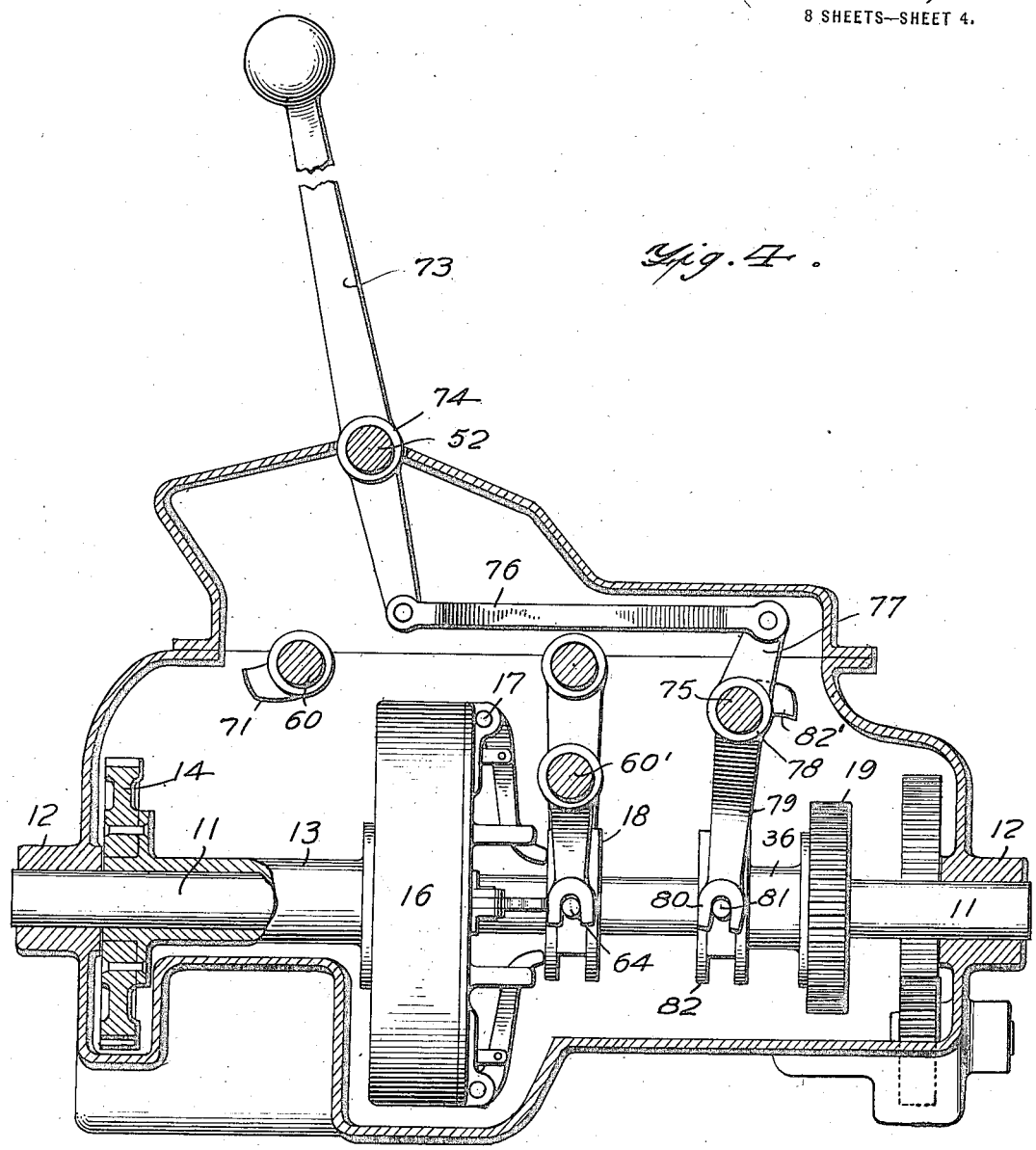

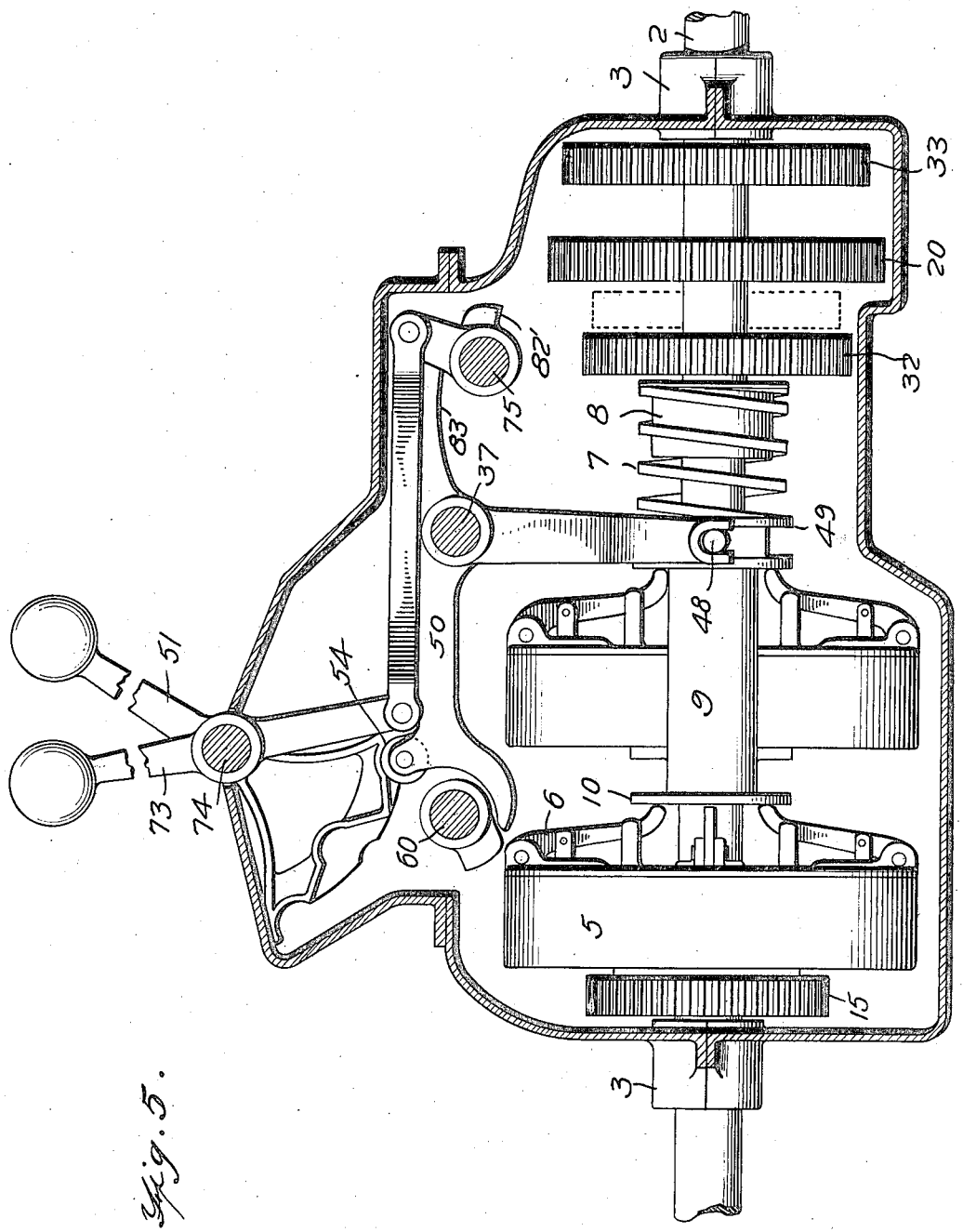

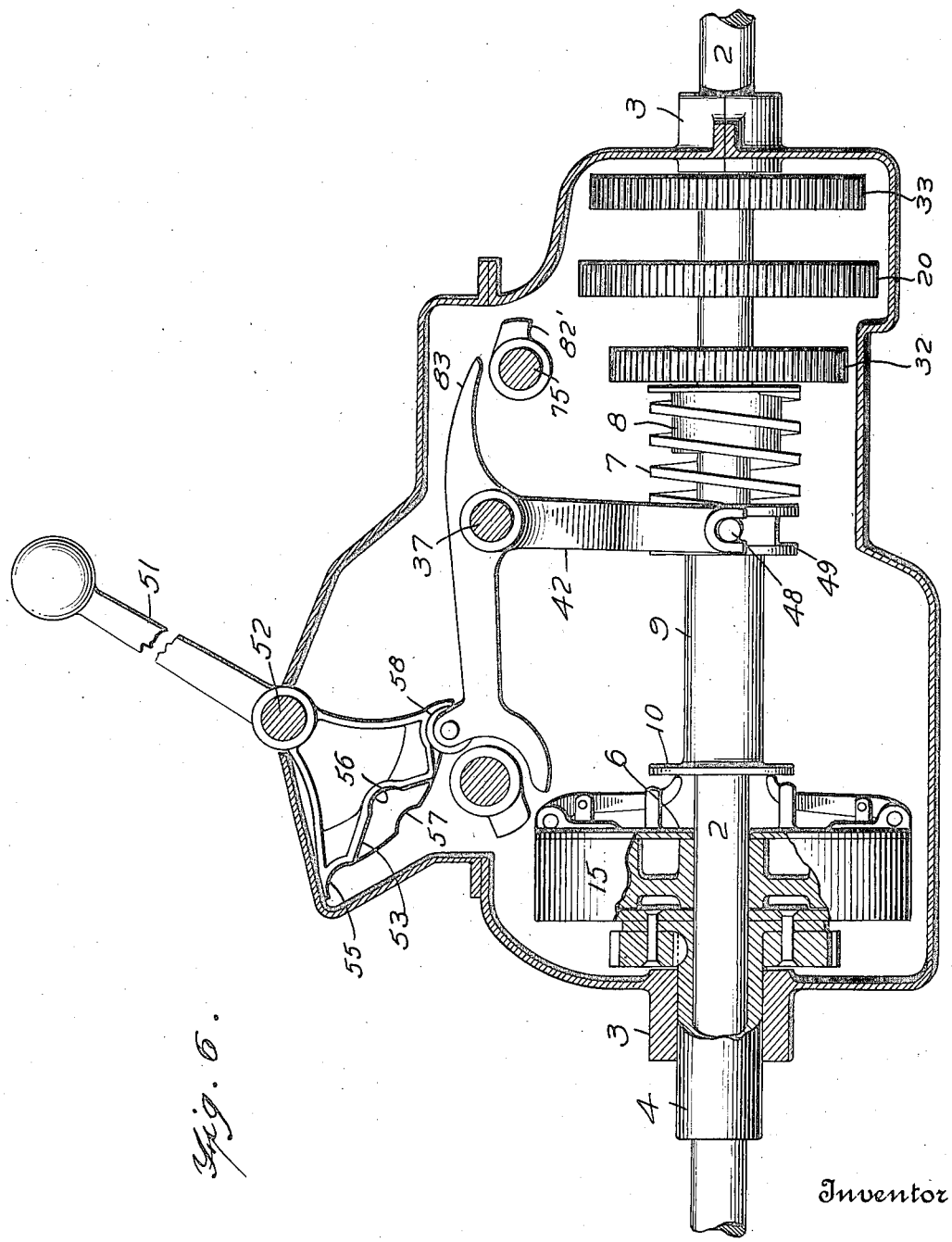

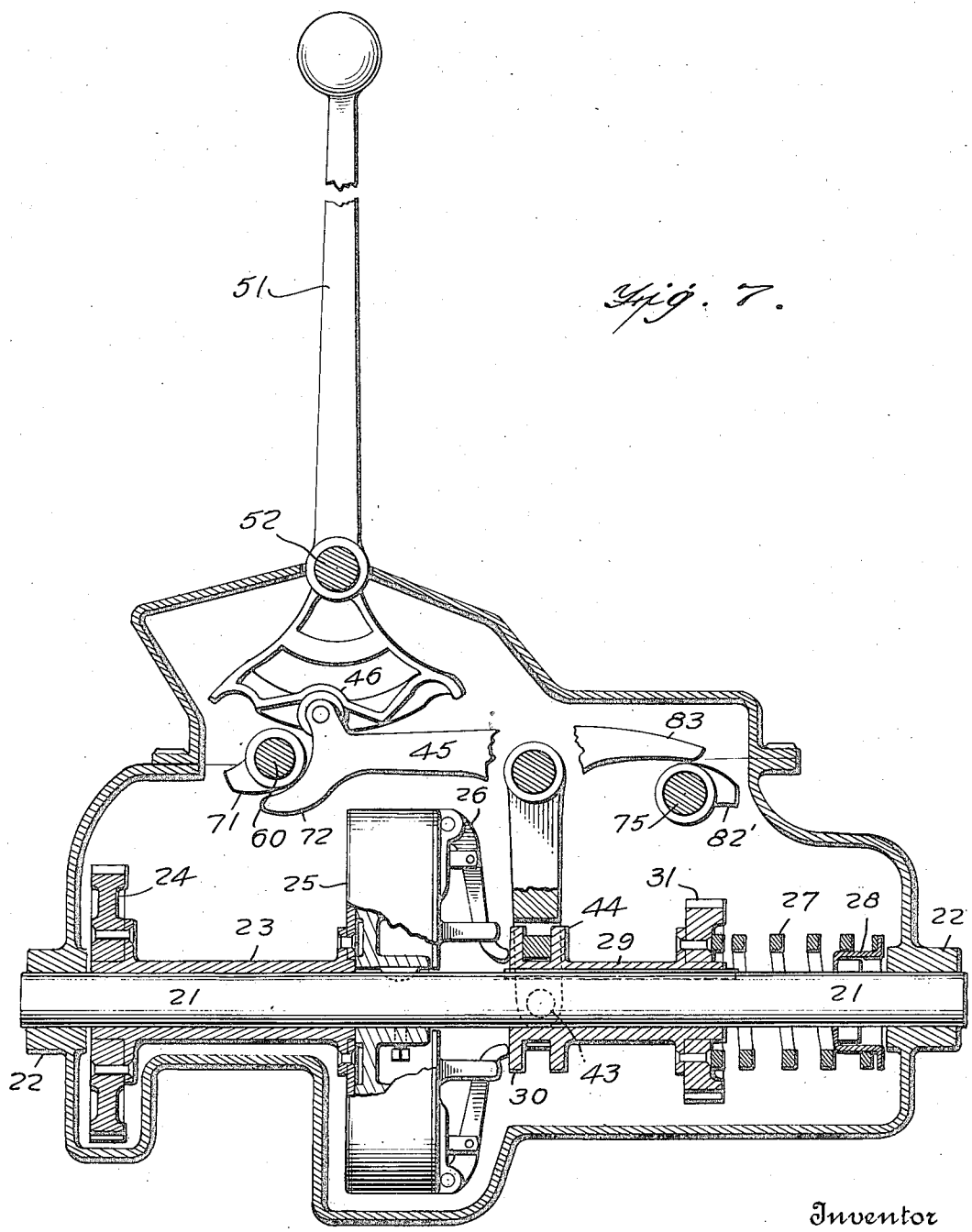

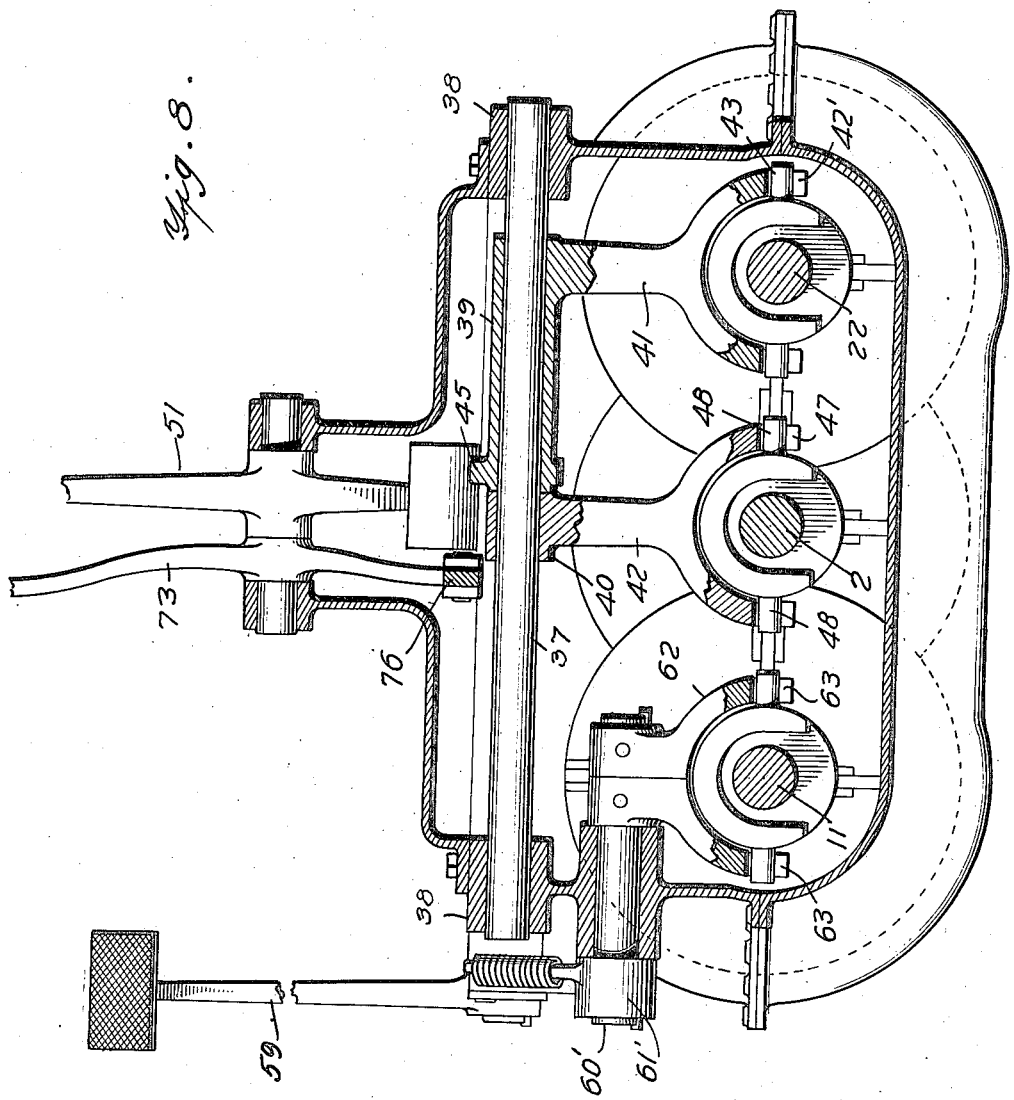

CHARLES R. SCOTT, OF WYANDOTTE, OKLAHOMA.

TRANSMISSION-GEARING.

1,380,599. Specification of Letters Patent. Patented June 7, 1921.

Application filed January 24, 1920. Serial No. 353,733.

*To all whom it may concern:*

Be it known that I, CHARLES R. SCOTT, a citizen of the United States, residing at Wyandotte, in the county of Ottawa and State of Oklahoma, have invented certain new and useful Improvements in Transmission-Gearing, of which the following is a specification.

This invention relates to transmission gearing, and it comprises a high speed shaft, an intermediate or second speed shaft, and a low speed shaft, means for connecting said high speed shaft to the main drive, gearing connecting said low and intermediate shaft to the main drive shaft, and to the high speed shaft, which also serves as a driven shaft, means to prevent the connection of more than one of said shafts to the drive shaft at the same time, and controlling means, said means comprising a hand lever to connect the high speed shaft or the intermediate shaft to the main drive shaft, and a separate lever to control the connection of said low speed shaft to the drive shaft, said second lever being adapted to operate controlling means to prevent the connection of the high speed shaft or the intermediate shaft while the low speed shaft is in engagement; all as more fully hereinafter set forth and as claimed.

The present invention is an improvement on that disclosed in Letters Patent No. 1,183,322, granted to me under date of May 16, 1916. In the present construction, I have so arranged the gearing connecting the driven shaft to the intermediate and low speed shafts, that the shafts may be constructed in single sections. The connecting clutches whereby the different speeds are obtained, are mounted on sleeves carried by the shafts thereby eliminating the necessity of constructing each shaft in a plurality of sections and connecting these sections by clutches.

In the present invention I have provided a separate lever, advantageously a foot pedal, to control the low speed gearing and the reverse gearing. With the present construction, it is possible to make an instant change from either high or intermediate speed to low speed and automatically return to the former speed by release of the low speed pedal.

The same pedal which controls the low speed gear, is also used to operate the reverse gear. A separate lever is provided for shifting the reverse gear to operative position, and it is necessary to connect the low speed gearing with the reverse lever in operative position to run the car in a reverse direction. It is practically impossible to accidentally place the gears in reverse as the reverse gear is shifted by a separate lever. If the reverse gear is accidentally moved to the operative position while the car is being driven forward, the low speed clutch will not be in position to furnish the necessary connection to operate in a reverse direction.

The construction embodied in the present invention is also advantageous as it permits the use of much lighter shafts and lighter gears than are now used in transmission gearing and because it eliminates clashing and grinding of gears.

In the accompanying drawings, I have shown an advantageous embodiment of this invention. In the showing, Figure 1 is a side elevation of the transmission gearing showing the outer casing and the arrangement of the control levers.

Fig. 2 is a horizontal sectional view taken on the line 2—2 of Fig. 1.

Fig. 3 is a horizontal sectional view taken on the line 3—3 of Fig. 1.

Fig. 4 is a vertical longitudinal sectional view on the line 4—4 of Fig. 2.

Fig. 5 is a vertical longitudinal sectional view on the line 5—5 of Fig. 2.

Fig. 6 is a similar view on the line 6—6 of Fig. 2.

Fig. 7 is a similar view on the line 7—7 of Fig. 2, and

Fig. 8 is a vertical transverse sectional view on the line 8—8 of Fig. 2.

Referring to Fig. 1 of the drawings, the gearing is mounted in the casing 1, which as shown, may be made in a plurality of sections secured to each other in any suitable manner.

As shown in Figs. 3, 5, and 6, a main shaft 2 is arranged substantially in the center of the casing. This shaft is connected to the mechanism to be driven at the rear, such as the differential gearing of a motor vehicle, (not shown). The shaft is mounted in bearings 3 and carries a sleeve 4 at its forward end. The sleeve 4 is adapted to be driven from any suitable source of power such as the engine of a motor vehicle, (not shown). When shaft 2 is out of engagement with the sleeve, the sleeve forms the forward bearing of the shaft, but when the two parts are revolving together the bearing 3 performs this function. As shown, a clutch 5 is arranged on the sleeve, the clutch being shown of the multiple disk type. The specific type of clutch employed forms no part of the present invention and any type of clutch may be used. The coacting clutch member 6 is keyed to the shaft to permit a longitudinal movement thereon, but to prevent relative rotation of the shaft and the clutch member. The two clutch members are held in contact by spring 7 mounted on a sleeve 8 secured to the shaft. The opposite end of the spring bears against the enlarged end of sleeve 9. The other end of sleeve 9 is provided with an annular flange 10 bearing against the clutch members and holding them in engagement with each other. It will be apparent that when the clutch members 6 and 7 are in engagement, the shaft 2 will revolve with the sleeve 4 giving a direct connection from the engine or source of power to the differential gearing or driven member at high speed.

The means for driving the driven element at low speed are more clearly shown in Figs. 3 and 4 of the drawings. As shown in these figures, low speed shaft 11 is arranged substantially parallel to the main driven shaft and mounted in bearings 12 in the casing. The shaft is provided with a sleeve 13 which is capable of rotation with respect to the shaft. This sleeve is provided with gear 14 meshing with gear 15 on sleeve 4 (see Fig. 3). The sleeve carries one element 16 of a clutch similar to the element 5 carried by the sleeve 4. The other element 17 of the clutch is splined or keyed on the low speed shaft to permit longitudinal movement in and out of engagement with the other clutch member. Clutch member 17 is moved in and out of engagement by drum 18 connected thereto and provided with operating means to be described. The shaft 2 is driven from the low speed shaft by gear 19 normally meshing with gear 20 on the main driven shaft (see Fig. 3).

In describing the connections for intermediate speed, reference will be had to Figs. 3 and 7 of the drawings. As shown, shaft 21 is arranged substantially parallel to main shaft 2 and is mounted in bearings 22 formed at the front and back of the casing. The sleeve 23 is rotatably mounted on this shaft and the sleeve carries a gear or pinion 24 meshing with the gear 15 on sleeve 4. The sleeve also carries one element 25 of a clutch, the other element 26 of the clutch being keyed to the shaft to permit longitudinal movement thereon. The clutch members are held in engagement by coiled spring 27 mounted on a sleeve or disk 28 carried by the shaft. The spring bears against one end of sleeve 29. The opposite end of sleeve 29 is provided with an enlargement 30 which engages the clutch element 26 and forces it into engagement with the other element of the clutch. Sleeve 29 which is movable longitudinally of the shaft carries a gear or pinion 31 which meshes with gear or pinion 32 on the main shaft when the clutch elements are in engagement.

The car is driven in a reverse direction by means of gear 33 mounted on the main shaft and meshing with an idler gear 34 carried by a stub shaft mounted in bearing 35. Gear 34 is driven by the gear 19 of the low speed shaft, this gear being carried by a sleeve 36 which is movable longitudinally on the shaft so as to bring the gear 19 into engagement with gear 20 for forward low speed, or into engagement with gear 34 for reverse.

The mechanism for shifting the gears is as follows:

Shaft 37 is arranged transversely of the gear casing above the main driven shaft, the intermediate shaft, and the low speed shaft (see Fig. 2.) This shaft is mounted in bearings 38. Sleeves 39 and 40 are arranged on the shaft and these sleeves are provided with depending forked levers 41 and 42 respectively (see Fig. 8). Lever 41 controls the operation of the clutch on the intermediate speed shaft, and lever 42 the operation of the clutch on the high speed shaft. As shown, the forked ends of the lever 41 is provided with slots 42' which are adapted to engage pins 43 in the drum 44 carried by sleeve 29. It will thus be seen that movement of the forked lever 41 to the rear will remove the pressure of the coiled spring from the clutch and thus disengage it. The sleeve 39 is provided with a horizontal extension 45 forming, in effect, a bell crank lever with the forked lever 41. A roller 46 is carried on the end of this lever and this roller engages the hand operated gear shifting lever to be described. The construction of the control means for the clutch on the main driven shaft is somewhat similar. As shown in Fig. 8, lever 42 is forked and provided with slots 47 to engage pins 48 on the drum 49 carried by the sleeve 9, (see Fig 3). A horizontal extension 50 is arranged on sleeve 40, forming a bell crank lever with the forked lever arm 42. It will be apparent that when extension 50 is depressed, forked lever 42 will be moved rearwardly removing the pressure of spring 7 from the clutch thus disengaging the clutch and the high speed drive.

As shown, a hand operated control lever 51 is employed for controlling the high speed and intermediate speed gearing. This lever is pivoted on stub shaft 52 and is provided with a plurality of recesses or depressions in its under face 53. Extension 50 is provided with roller 54, similar to the roller 46 arranged upon the extension arm 45. These rollers are adapted to engage the depressions in the face 53 of the operating lever. Depression 55, arranged at the front of the face of the operating lever extends entirely across the operating lever in transverse alinement with the rollers 46 and 54, and when the control lever is thrown to extreme forward position, the two rollers will be received in this recess to depress the forward end of the horizontal extensions and disconnect both the high speed gearing and the intermediate speed gearing. If the low speed gearing is also disengaged the gearing will then be in neutral position. A second depression 56 is provided in face 53, this depression extends merely part of the way across the face transversely in alinement with roller 46, (see Fig. 7). When roller 46 is seated in depression 56, the arm 45 will be in a substantially horizontal position and the forked lever 41 will be in a substantially vertical position. This depression is of such depth that the roller 46 merely enters it but does not actually come in contact with the face of the operating lever, thus insuring the full force of coil spring 27 to bear against sleeve 29 and hold the clutch sections 25 and 26 in engagement with each other. At the same time, the position of roller 46 in depression 56, prevents accidental displacement of the control lever. When the lever is in this position, roller 54 is in engagement with the depression 57 (see Fig. 6) of substantially less depth whereby horizontal arm 50 is depressed and forked lever 42 is swung rearwardly to remove the pressure of spring 7 from the clutch 6 and thus disengage the high speed gear. It will thus be seen when the lever is in position shown in Fig. 7 of the drawings, the transmission is in intermediate or second speed.

When the lever is moved rearwardly to the position shown in Figs. 5 and 6 of the drawings, the roller 54 enters a depression 58 permitting the arm 50 to swing to a substantially horizontal position, and permitting the forked lever 42 to assume a substantially vertical position. This depression is of sufficient depth to permit arm 50 to assume a horizontal position before the roller actually engages the surface of the depression, thus insuring the full pressure of spring 7 on sleeve 9, and through it, on the clutch member. This connects the shaft 2 directly to the sleeve 4 for high speed, and the position of roller 54 in depression 58 prevents accidental displacement. When the high speed gear is thrown into operation, roller 46 engages the face 53 of the operating lever depressing arm 45 and swinging forked lever 41 rearwardly to remove the pressure of the spring from sleeve 29 and permit the clutch elements 25 and 26 to disengage.

The low speed gearing is controlled by a foot pedal 59 which is pivoted on shaft 60 mounted in a bearing 61 in the casing. Depending forked lever 62 having slotted ends 63 is arranged on stub shaft 60'. This shaft is mounted in bearing 61'. The slotted ends of the lever are adapted to engage pins 64 on the drum 18, on the low speed shaft. The clutch element 17 on shaft 11 is connected to this drum and is moved in and out of engagement by movement of the drum. It will be seen that when the stub shaft is rotated, the drum will be moved forward on low speed shaft 11 to bring the clutch elements into engagement. A spring 65 is provided for normally holding the low speed pedal in inactive position.

Means are provided for preventing engagement of either the high speed gearing, or the intermediate gearing when the low speed gearing is thrown into engagement. The low speed pedal is mounted on a shaft 60' and is provided with an extension 66 having a slot 67 at the free end. The extension 66 is connected to shaft 60' by links 68 and 69. Link 69 is provided with pin 70 and this pin is received in the slot 67. In order to bring the low speed gear into engagement, the pedal 59 is depressed and shaft 60' is revolved through the link connections. The depressions of pedal 59 does not revolve the shaft until the pedal has been depressed about half way due to the slotted connection.

Means are provided for preventing engagement of the high speed gearing, on the intermediate speed gearing, while the low speed gearing is in engagement. Shaft 60 on which the pedal is mounted, is provided with a pair of cams 71 (see Figs. 4 and 7). When the shaft is rotated, these cams engage extension 72 on the horizontal arms 45 and 50 and depress them if they are in horizontal position. The depression of these arms disengages the high speed gear or the intermediate speed gear, if either of them are in engagement, before the low speed gear is thrown into engagement. As stated, the low speed gear is not thrown into engagement until the pedal has been depressed more than half way, due to the slot and pin construction 67 and 70. When the pressure is removed from the foot pedal, it assumes its normal position. Drum 18 then moves rearwardly on shaft 11 to disconnect clutch elements 16 and 17, and cam 71 moves out of engagement with either of the arms 45 or 50 allowing the arm to assume its original position; thus throwing the gearing back into second or high speed. It will thus be seen that the gearing may be changed from second or high speed to low speed by depression of the pedal 59 and automatically thrown back to its original speed when the pressure on the pedal is released. The pedal 59 also serves as means for disconnecting the gearing entirely through the provision of the slotted connection. When the pedal is depressed half way the low speed gearing has not yet been connected, but the cam 71 has disconnected the high speed gearing or the second speed gearing as the case may be, thus entirely disconnecting the drive means from the driven shaft.

The means to operate the reverse gearing comprises a hand lever 73 which is pivoted to the casing at 74 and connected to transverse shaft 75 by links 76 and 77. A sleeve 78 is arranged upon this shaft and is provided with a forked lever 79 having slotted ends 80 engaging pins 81 on drum 82 carried by sleeve 36. When the lever 73 is moved rearwardly, sleeve 36 is also moved rearwardly to disconnect gear 19 from gear 20 and bring it into engagement with idler gear 34. After the reverse gear has been set, shaft 11 is connected to the drive by depressing foot pedal 59.

Means are provided for preventing engagement of the reverse gear while the high speed gearing or intermediate speed gear is in engagement. Shaft 75 is provided with cams 82' which are adapted to engage extensions 83 on the arms 45 and 50 (see Figs. 6 and 7). When the shaft 75 is revolved, due to the operation of the reverse lever, cams 82' engage the extensions 83 (if either the high speed gearing or the intermediate speed gearing is in active position) and revolve sleeve 39 or 40, as the case may be, to swing lever 41 or 42 rearwardly and disconnect the clutch of the high speed gearing or the intermediate speed gearing. It will thus be seen that it is practically impossible to accidentally move the reverse lever into operation, and that the reverse gearing cannot be thrown into operation when the car is going forward in either high speed or intermediate speed. Even if lever 73 were accidentally operated, the only result would be to disconnect the drive shaft and driven shaft. This reverse gearing will not operate until the low speed lever is depressed.

The operation of the device is apparent from the above, and further description is deemed unnecessary. It will be seen that I have provided a transmission gearing which is positive in operation, simple in construction, and highly efficient. The provision of a separate operating mechanism for the low speed gearing produces a transmission having three forward speeds which may be readily shifted from high or intermediate speed to low speed, and which will automatically return to the former speed when the pressure is removed from the low speed lever. The gearing may be readily changed from high or intermediate speed to neutral by depressing the low speed lever half way and automatically returned when the pressure is relieved from the low speed lever.

It will be noted that the gear 31 on the intermediate shaft is out of engagement with gear 30, when the clutch elements 25 and 26 are disconnected, and that the shaft 21, sleeve 29, drum 30 and gear 31 do not rotate. By shifting the low speed and reverse gear into a neutral position, as shown in Fig. 3, the shaft 11, gear 19, sleeve 36 and drum 82 may be brought to a state of rest. Thus, when the gearing is being driven at high speed, all of the gears in the rear end of the transmission will be at rest except those carried by shaft 2 and the stub gear 34, which eliminates noises when running at high speed.

What I claim is:

1. Transmission gearing comprising a main drive shaft, high, intermediate and low speed shafts, gearing mounted on said shafts, gearing on the main drive shaft adapted to mesh therewith, controlling means for said high and intermediate gearing, separate control means for said low speed gearing, and means operable by said low speed control means to disconnect said high or intermediate speed gearing.

2. Transmission gearing comprising a main drive, a high speed shaft adapted to be connected to the main drive, intermediate and low speed shafts adapted to be connected to the main drive, independent clutches for controlling the connection of said shafts to the main drive, an operating lever to connect and disconnect said high and intermediate shafts, a separate operating lever to control the low speed connection, and means operable by the low speed control to disconnect the high or intermediate speed gearing.

3. Transmission gearing comprising a main drive, a driven shaft arranged adjacent the main drive and adapted to be connected thereto for high speed, intermediate and low speed shafts connected to the main drive by gearing, said intermediate and low speed shafts being also adapted to be connected to the driven shaft to drive said shaft, controlling means for the high and intermediate speed gearing, and separate controlling means for the low speed gearing.

4. Transmission gearing comprising a main drive, a driven shaft arranged adjacent the main drive and adapted to be connected thereto for high speed, intermediate and low speed shafts connected to the main drive by gearing, said intermediate and low speed shafts being also adapted to be connected to the driven shaft to drive said shaft, controlling means for the high and intermediate speed gearing, separate controlling means for the low speed gearing, and means operable by said low speed controlling mechanism to disconnect the high or intermediate speed gearing.

5. Transmission gearing comprising a main drive, a driven shaft arranged within the main drive, a clutch adapted to connect said driven shaft and the main drive to obtain high speed, intermediate and low speed shafts arranged near said driven shaft, sleeves carried by said intermediate and low speed shafts, a pinion arranged on each of said sleeves and meshing with a pinion on the main drive, clutches connecting the intermediate and low speed shafts to the sleeves mounted thereon, a plurality of pinions arranged on the driven shaft, and pinions arranged on the intermediate and low speed shafts adapted to mesh therewith.

6. Transmission gearing comprising a main drive, a driven shaft arranged within the main drive, a clutch adapted to connect said driven shaft and the main drive to obtain high speed, intermediate and low speed shafts arranged near said driven shaft, sleeves carried by said intermediate and low speed shafts, a pinion arranged on each of said sleeves and meshing with a pinion on the main drive, clutches connecting the intermediate and low speed shafts to the sleeves mounted thereon, a plurality of pinions arranged on the driven shaft, an idler pinion mounted on a stub shaft and meshing with one of said pinions, a pinion mounted on the intermediate shaft meshing with one of said pinions, a pinion mounted on the low speed shaft and meshing with one of said pinions to drive the gearing at low speed, said pinion being adapted to mesh with said idler pinion to drive the gearing in a reverse direction.

7. Transmission gearing comprising a main drive, a driven shaft, high and intermediate speed shafts arranged near said driven shafts, means for directly connecting said driven shaft to the main drive, means for connecting the intermediate or low speed shafts to the main drive, a plurality of pinions mounted on the driven shaft, pinions mounted on the intermediate and low speed shafts adapted to mesh with one of said pinions on the driven shaft, controlling mechanism for the high and intermediate speed gearing, and separate controlling means for the low speed gearing.

8. Transmission gearing comprising a main drive, a driven shaft, high and intermediate speed shafts arranged near said driven shafts, means for directly connecting said driven shaft to the main drive, means for connecting the intermediate or low speed shafts to the main drive, a plurality of pinions mounted on the driven shaft, pinions mounted on the intermediate and low speed shafts adapted to mesh with one of said pinions on the driven shaft, controlling mechanism for the high and intermediate speed gearing, and separate controlling means for the low speed gearing, and means operable by said low speed controlling mechanism to disengage the high or intermediate speed gearing.

9. Transmission gearing comprising a main drive, a driven shaft, intermediate and low speed shafts, said driven shaft being adapted to be connected to the main drive shaft for high speed, means for connecting the intermediate and low speed shafts to the main drive, a plurality of pinions carried by said driven shaft, an idler pinion meshing with one of said pinions, a pinion on the intermediate shaft adapted to mesh with one of said pinions on the driven shaft, a pinion on the low speed shaft adapted to mesh with one of said pinions on driven shaft and also adapted to mesh with said idler pinion to reverse said gearing, controlling means for said high and intermediate speed drives, separate controlling means for said low speed drive, and separate controlling means for said reverse drive.

10. Transmission gearing comprising a main drive, a driven shaft, intermediate and low speed shafts, said driven shaft being adapted to be connected to the main drive shaft for high speed, means for connecting the intermediate and low speed shafts to the main drive, a plurality of pinions carried by said driven shaft, an idler pinion meshing with one of said pinions, a pinion on the intermediate shaft adapted to mesh with one of said pinions on the driven shaft, a pinion on the low speed shaft adapted to mesh with one of said pinions on driven shaft and also adapted to mesh with said idler pinion to reverse said gearing, controlling means for said forward drives, separate controlling means for said reverse drive, and means operable by said reverse controlling means to disconnect said forward drives.

11. Transmission gearing comprising high, intermediate and low speed gearing, controlling mechanism for said high and intermediate speed gearing and separate controlling mechanism for said low speed gearing, said separate controlling mechanism comprising a lever, a shaft on which said lever is mounted, a slotted arm connected to said shaft, links connected to said slotted arm and to said low speed gearing, and means upon said shaft to disconnect the high and intermediate speed gearing when said shaft is revolved.

12. Transmission gearing comprising high, intermediate, and low speed gearing, operating mechanism for said gearings, a control lever for said high and intermediate speed gearing, and separate controlling mechanism for said low speed gearing, said controlling mechanism being adapted to coöperate with the operating mechanism of the low speed gearing, said control lever being provided with depressions to receive the operating mechanisms of the high and intermediate speed gearings, one of said depressions being adapted to maintain the high and intermediate speed gearing in an inoperable position.

13. Transmission gearing comprising a main drive shaft, high, intermediate, and low speed shafts, gearing mounted on said shafts, gearing on the main drive adapted to mesh therewith, an idler gear arranged between said main drive shaft and said low speed shaft, gearing on each of said shafts adapted to mesh with said idler gear, controlling means for said high and intermediate gearing, separate controlling means for said low speed gearing, and means for moving one of said gears adapted to mesh with said idler gear into mesh therewith, said means being adapted to disconnect said high and intermediate speed gearing.

14. Transmission gearing comprising a main drive shaft, a plurality of shafts arranged adjacent said main drive shaft, gearing mounted on said shafts, gearing on the main drive shaft adapted to mesh therewith, controlling means adapted to control the connections between said main shaft, and a plurality of said shafts arranged adjacent thereto, separate control means to control the connection between said main shaft and one of said shafts arranged adjacent thereto, an idler gear arranged between one of said shafts and the main drive shaft, gearing on the main drive shaft and the other shaft adapted to mesh with said idler gear, and means for moving one of said gears into mesh with said idler gear, said means being adapted to disconnect the gearing of the remaining shafts.

In testimony whereof I affix my signature in presence of two witnesses.

CHARLES R. SCOTT.

Witnesses:
MAUDE L. SCOTT,
R. B. DEMAREE.